United States Patent [19]

Schoenholz et al.

[11] 3,881,948
[45] *May 6, 1975

[54] METHOD FOR REMOVING ORGANIC ACID SOIL FROM SURFACES

[75] Inventors: Daniel Schoenholz, Basking Ridge; Arthur W. Petersen, Florham Park; Marcus Allen Northup, Jr., Morristown, all of N.J.

[73] Assignee: Church & Dwight Co., Inc., New York, N.Y.

[ * ] Notice: The portion of the term of this patent subsequent to Apr. 30, 1991, has been disclaimed.

[22] Filed: July 20, 1973

[21] Appl. No.: 381,053

[52] U.S. Cl. ................ 134/2; 134/19; 134/22 C; 134/40
[51] Int. Cl. .............................................. B08b 3/10
[58] Field of Search ............... 134/2, 19, 22, 40, 39; 252/158

[56] References Cited
UNITED STATES PATENTS

| | | | |
|---|---|---|---|
| 2,992,995 | 7/1961 | Arden | 134/39 X |
| 3,031,408 | 4/1962 | Perlman et al | 252/158 X |
| 3,335,092 | 8/1967 | Perry | 252/158 |
| 3,658,711 | 4/1972 | Mukai et al | 252/90 |
| 3,779,933 | 12/1973 | Eisen | 252/158 |
| 3,808,051 | 4/1974 | Schoenholz et al | 134/2 |

OTHER PUBLICATIONS

"Oven Cleaners Become More Sophisticated to Meet Demands of a Growing Market," Chemical and Engineering News, (Aug. 23, 1965), p. 47.

Primary Examiner—S. Leon Bashore
Assistant Examiner—Marc L. Caroff
Attorney, Agent, or Firm—Hammond & Littell

[57] ABSTRACT

A method of removing soils containing free or combined organic acids comprising contacting the said soil with a composition containing at least one polyhydric alcohol or a lower aliphatic ester or ether thereof having at least two free hydroxyl groups and a small amount of an alkaline acting catalytic compound capable of accelerating alcoholysis reactions, heating the soil and cleaning composition to at least 250 F and then removing the residue, and to novel cleaning compositions.

10 Claims, No Drawings

3,881,948

METHOD FOR REMOVING ORGANIC ACID SOIL FROM SURFACES

STATE OF THE ART

The removal of soils containing free or combined organic acids from hard surfaces such as metal or ceramics has received much study. This type of soil occurs as a varnish on engine parts or as soil in ovens, baking pans, barbecue racks, etc. The organic acid in the soil is usually in the form of the free acid or as easily saponifiable esters thereof.

Oven interiors soiled by baked-on grease and splattered food stuffs have been cleaned by applying to the soiled interiors solutions containing saponification agents, catalytic metal salts and oxides, as well as ammonia producing compounds, either preceded or followed by heating of the soiled interiors in order to cause a chemical reaction with the soiling agent. For example see U.S. Pat. Nos. 3,549,419; 3,031,408; 3,031,409; 3,079,284; 3,196,046; 3,331,943 or 3,335,092. However, there are certain difficulties associated with the use of the above solutions, such as harsh fumes emanating from the oven which are harmful to the eyes and on contact can produce skin damage. These solutions if accidently spilled during usage are capable of producing corrosion damage to floors, painted surfaces, chrome, aluminum, etc.

It has also been suggested to utilize liquid silicone preparations on clean oven walls to keep food residues from sticking, and/or to make any residues easier to wash out after use as can be seen in U.S. Pat. Nos. 3,303,052; 3,196,027; and 3,183,110. The difficulty herein is that these preparations are only effective if applied to a clean oven before the walls become soiled, and they are not effective for cleaning the walls once they have become soiled.

Ovens having catalytic oven liners intended to be continuously self-cleaning at normal use temperatures below 600°F are also known as described in U.S. Pat. Nos. 3,460,523 and 3,266,477. Another proposal has been to design ovens for self-cleaning with auxilary heaters intended to raise the oven temperature to about 900°C to burn off spilled food stuffs. It has also been proposed to equip such ovens with catalytic after burners to consume smoke generated during cleaning as in U.S. Pat. Nos. 3,428,434; 3,428,435; and 3,423,568. These devices are not without certain difficulties in that they will sometimes emit smoke if major spills are not wiped up before heating to the cleaning temperature range. Furthermore, it is necessary to resort to oven temperatures much higher than normally used in order for the self-cleaning device to become operable.

In our copending, commonly described patent application Ser. No. 361,140 filed May 17, 1973 now U.S. Pat. No. 3,808,051 we describe a cleaning composition for the removal of organic acid containing soil comprising (A) at least 1 percent by weight of a substance selected from the groups consisting of (1) at least one alkali metal salt of a weak organic acid, said salt melting at elevated temperatures, preferably below about 550°F and said weak organic acid constituent part being volatile and/or decomposing at said elevated temperatures on contact with organic acid containing soils or (2) mixtures of salts thereof, the mixtures having melting points lower than the cleaning temperature, preferably less than 550°F; and (B) up to 99 percent by weight of a carrier. The novel method of cleaning organic acid containing soils described therein comprises applying the said salt or salts of weak organic acid to said soil, heating the salt(s) and soil above the melting point of the said salt(s) and then removing the residue.

The mode of action in our application Ser. No. 361,140 is believed due to reaction of the alkali metal ions with the organic acids in the soil or their easily saponified esters to form the alkali metal salts of the organic acid which are then easily removed while an approximately proportionate amount of the weak acid is volatilized and/or decomposed.

OBJECTS OF THE INVENTION

It is an object of the invention to provide novel compositions for removing organic acid containing soil wherein the active ingredient is a polyhydric alcohol with at least 2 free hydroxy groups containing a small amount of an alkaline acting catalyst capable of accelerating alcoholysis reactions.

It is another object to provide a novel method of removing organic acid containing soil from a surface.

It is a further object of the invention to provide a novel method of removing food soil from ovens at normal operating temperatures without corrosive materials and with minimal noxious fumes.

These and other objects and advantages of the invention will become obvious from the following detailed description.

THE INVENTION

The novel cleaning method of the invention for the removal of soil containing free or combined organic acids from a surface comprising applying to said surface an effective amount of at least one polyhdric alcohol or a lower aliphatic carboxylic acid ester or ether thereof having at least 2 free hydroxyl groups and a small amount, i.e. up to 2 percent by weight, of an alkaline acting catalyst selected from the group consisting of alkali metal and alkaline earth bases and salts, heating the said treated surface to a temperature of 250°F. to 550°F and then removing the soil residue from the said surface.

It is believed that the polyhydric alcohols and their aliphatic carboxylic esters or ethers having at least two free hydroxyl groups when heated above 250°F. with the soil containing the organic acid undergo an alcoholysis reaction resulting in the formation of water-soluble or dispersible compounds which are easily washed away. The presence of the alkaline reacting compound in small amounts is believed to catalyze the alcoholysis reaction. Amounts in the range of 0.01 to 2.0 percent, preferably 0.1 to 1.0 percent of alkaline acting catalyst have been found to be suitable for speeding up the alcoholysis reaction. The minimum effective amount of catalyst will be found to vary somewhat with the nature of the soil, the polyhydric alcohol or mixture of alcohols selected, and the particular alkaline acting compound being used. While there is no harm in using substantially larger amounts of catalyst than the minimum effective amount, it is not necessary.

The polyhydric alcohols and their aliphatic carboxylic esters or ethers having at least 2 free hydroxyl groups should be sufficiently non-volatile to be retained on the surface to be cleaned at the operating temperatures. Since some polyhydric alcohols are co-distilled or steam distilled when water is present in the composition, the compositions should contain as little water as possible, preferably being anhydrous. If water is present in the composition, and the selected polyhydric alcohol is also distillable then more of the alcohol should be used to ensure thorough cleaning. When the compositions are to be used for oven cleaning, it is preferred to use compositions containing little or no water and to use a less volatile polyhydric compound to avoid excessive loss by distillation.

Such less volatile polyhydric alcohol compounds should preferably boil above about 300°F, be water soluble for ease of washing out any quantity remaining after heating, and should preferably melt below about 500°F to facilitate good contact with the soiled surface. We have found that polyhydric compounds having a numerical ratio of carbon atoms to hydroxyl groups as high as 15 to 1 may be used, but that those having a ratio of 4 to 1 or less are preferable.

Examples of suitable polyhydric alcohol compounds having at least 2 free hydroxy groups are ethylene glycol, diethylene glycol, triethylene glycol, various commercial mixtures of higher polyethylene glycols such as Carbowax 400 sold by the Union Carbide Corporation, glycerol, diglycerol, triglycerol and higher mixed polyglycerols, pentaerythritol, inositol, trimethylol ethane, trimethylol propane, sorbitol, mannitol, aliphatic diols such as 1,4-butanediol, aliphatic triols such as 1,2,6-trihydroxyhexane and lower aliphatic carboxylic acid esters having at least 2 free hydroxy groups such as monoacetin. The preferred compounds are mannitol and sorbitol since they are non-volatile and do not fume even when used in aqueous solutions of the salts.

The aliphatic carboxylic acids used to form the esters have 1 to 7 carbon atoms and examples of said acids are acetic acid, propionic acid, butyric acids, acrylic acid, etc. The ethers may be alkyl ethers of 1 to 7 alkyl carbon atoms or polyglycols or polyglycerols.

Examples of suitable alkaline acting catalysts capable of accelerating the alcoholysis reaction are alkali metal and alkaline earth metal bases and salts such as sodium hydroxide, potassium hydroxide, lithium hydroxide and hydrates thereof, calcium hydroxide, sodium carbonate, potassium carbonate, lithium carbonate, etc. and salts of weak aliphatic acids such as sodium acetate, potassium acetate, calcium acetate, lithium acetate, sodium formate, sodium glycinate, sodium gycolate, etc. Other known alkaline acting alcoholysis catalysts such as alkali metal alcoholates, or the oxides or alkoxides of calcium, magnesium, lead, tin, or zinc may also be used. Some of the foregoing examples of catalysts are, of course, more active than others and, accordingly, may be used in smaller amounts. However, when the compositions of this invention are to be used for oven cleaning, we prefer to select non-caustic and non-toxic ones.

The method of the invention may be used for cleaning ovens or other heat resistant objects such as kitchen or oven utensils made of heat resistant glass, ceramic materials, porcelain enamelled metal, aluminum, stainless steel or chromium plated metals.

The compositions of the invention have the advantage over the prior art cleaning compositions in that they are non-hazardous. They are safe to handle as they do not produce skin irration or noxious fumes and will not cause damage to kitchen surfaces as they are not strongly alkaline.

The physical form of the compositions may vary considerably depending upon whether the composition is to be utilized as a paste, liquid, or aerosol. Thickened solutions or suspensions of the polyhydric alcohol which can be applied by brush or solutions packaged in aerosol containers and applied by spraying are preferred for application to overhead or vertical surfaces.

The concentrations of the said polyhydric alcohol in the paste, liquid or aerosol preparations may be low as 1 per cent by weight based upon the total weight but is preferably 10 to 90 percent. There may be up to 99 percent by weight based upon the total weight of a carrier, or in the case of an aerosol preparation, carrier plus propellant. Anhydrous polyhydric alcohol compounds or mixtures thereof are preferred.

Any thickening agent compatible with the polyhydric alcohol compound may be used. Some useful organic agents are starch, sodium carboxymethycellulose, hydroxyethyl cellulose, methocel, and water-soluble polymers such as carboxy vinyl polymer (Carbopols from B.F. Goodrich Chemical Company) and most preferred are Xanthan gums. Inorganic colloidal materials such as Veegum (magnesium aluminum silicates manufactured by R.T. Vanderbilt) are also effective.

It may also be preferable to have present as a component of the solutions a minor amount of surface active agent which will cause the solution to spread evenly over the soiled surface, or to form a foam. The surface active agents can be any of those commonly known and used as such. An extensive list of such agents appears in the publication McCutcheon's Detergents & Emulsifiers, 1972 Annual. The agents can be anionic, cationic, nonionic, or amphoteric and should be compatible with the other ingredients and impart the desired surface active properties.

Examples of anionic surfactants include (a) carboxylic acids such as soaps of straight chained naturally occuring fatty acids, chain-substituted derivatives of fatty acids, branched-chain and odd-carbon fatty acids, acids from paraffin oxidation, and carboxylic acids with intermediate linkages; (b) sulfuric esters such as sodium lauryl sulfate, tallow alcohol sulfates and coconut alcohol sulfates.

Examples of cationic surfactants include (a) nonquaternary nitrogen bases such as amines without intermediate linkages, and (b) quaternary nitrogen bases of the formula

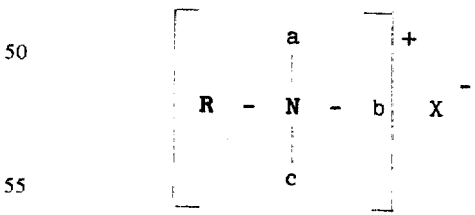

wherein R is straight-chain alkyl of 12 to 19 carbon atoms, wherein $a$, $b$, and $c$ are methyl, ethyl or benzyl (usually not more than one benzyl group being present), and wherein X is halide such as chloride, bromide or iodide, methylsulfate or ethylsulfate and quaternary ammonium salts such as Hyamine 10X (diisobutylcresoxy ethoxyethyl dimethylbenzyl ammonium chloride monohydrate).

Examples of nonionic surfactants include polyethyleneoxy ethers of alkylphenols, alkanols, mercaptans, esters as well as polyethyleneoxy compounds with amide links.

It may also be preferable to have present in the compositions a minor percentage of an inert, fine granular material such as ground calciumcarbonate to assist in holding the compositions in contact with the soil during the heating step.

In the following examples there are described several preferred embodiments to illustrate the invention. However, it should be understood that the invention is not intended to be limited to the specific embodiments.

EXAMPLE 1

A small amount of lard was melted and brushed in a thin layer onto a porcelain enamelled test tray which was then baked for one hour in an oven at 500°F. This baking converted the lard into a hard, brown, varnish-like material, similar in composition and appearance to the baked-on fatty residues that build up in household cooking ovens during repeated use.

Each of the cleaning compositions set forth in Table 1 was brushed onto 2 inch by 3 inch spots on test trays coated with baked lard as described above and the painted trays were placed in an oven. They were then heated for 45 minutes to a final temperature of 350° or 450°F after which they were cooled and the residue was washed off with a wet sponge, resulting in the cleaning of the porcelain enameled surfaces of the trays as reported in Table 1. It has been previously established in our co-pending patent application Ser. No. 361,140 filed May 17, 1973 that this test procedure is indicative of the efficiency of cleaning actual soiled ovens. References is also made to Example 4 hereof.

The word "cleaning" when used as a heading in Table 1 and subsequent tables means the percentage of soil which could be removed by simply wiping with a wet cloth and rinsing with water.

The word "scrubbed" following a percentage of soil removed in the tables means that additional rubbing with a nonscratching scouring pad such as those commonly sold for cleaning Teflon-lined cookware was required to effect complete removal of the soil. Rubbing with such a pad has virtually no effect on hard-baked fatty soils which have not been previously treated with one of the cleaning compositions described herein.

Wherever the words "washed" and "scrubbed" appear together in the tables they mean that following a test treatment, for example, 80 percent of the treated soil could be washed away with a wet cloth while the remaining 20 percent (to a total of 100 percent of the original soil) required scrubbing with the above described non-scratching scouring pad.

Under the heading "Solubility of Catalyst in Alcohol" the symbols used have the following meanings:

+ Dissolved to a clear solution on warming to 275°F
S Formed a turbid suspension
P Partially dissolved with some undissolved material settling out
− Did not visibly dissolve or disperse

TABLE 1

Various Polyhydric Alcohols

| Alcohol | Weight % of Catalyst | Solubility of Catalyst in alcohol | % cleaning at temp. of: 450°F | % cleaning at temp. of: 350°F |
|---|---|---|---|---|
| Diglycerol | No Catalyst |  | 100* | None |
|  | 1% KOAc | + | 100 | 100 |
|  | 1% KOH | + | 100 | 100 |
|  | 1% Na₂CO₃ | P | 100 | 100 |
|  | 0.1% KOAc | + | 100 | 100 (scrubbed) |
|  | 0.1% KOH | + | 100 | 100 |
|  | 0.1% Na₂CO₃ | P | 100 | 80 (washed) |
|  |  |  | *swelled and peeled off | 100 (scrubbed) |
| Ethylene glycol | No Catalyst |  | None | None |
|  | 1% KOAc | + | 100 | 75 (washed) |
|  |  |  |  | 100 (scrubbed) |
|  | 1% KOH | + | 100 | 100 |
|  | 1% Na₂CO₃ | P | 100 | 75 (washed) |
|  |  |  |  | 100 (scrubbed) |
|  | 0.1% KOAc | + | 100 (scrubbed) | 10 (washed) |
|  |  |  |  | 25 (scrubbed) |
|  | 0.1% KOH | + | 100 | 70 (washed) |
|  |  |  |  | 90 (scrubbed) |
|  | 0.1% Na₂CO₃ | P | 60 (washed) | 60 (washed) |
|  |  |  | 100 (scrubbed) | 100 (scrubbed) |
| Diethylene glycol | No Catalyst |  | None | None |
|  | 1% KOAc | + | 60 (washed) | Not Tested |
|  |  |  | 90 (scrubbed) |  |
|  | 1% KOH | + | 100 | Not Tested |
|  | 1% Na₂CO₃ | P | 30 (scrubbed) | Not Tested |
|  | 0.1% KOAc | + | 25 (scrubbed) | 10 (scrubbed) |
|  | 0.1% KOH | + | 50 (scrubbed) | 25 (scrubbed) |
|  | 0.1% Na₂CO₃ | P | None | None |
| Triethylene glycol | No Catalyst |  | None | None |
|  | 1% KOAc | + | 100 | Not Tested |
|  | 1% KOH | + | 100 | Not Tested |
|  | 1% Na₂CO₃ | P | 70 (scrubbed) | Not Tested |
|  | 0.1% KOAc | + | None | None (light soil) |
|  | 0.1% KOH | + | None | 50 (scrubbed) |
|  | 0.1% Na₂CO₃ | P | None | None |
| Triglycerol | No Catalyst |  | 100 | 100 |
|  | 1% KOAc | + | 100 | 100 |
|  | 1% KOH | + | 100 | 100 |
|  | 1% Na₂CO₃ | P | 100 | 100 |
|  | 0.1% KOAc | + | 100 | 100 |
|  | 0.1% KOH | + | 100 | 100 |
|  | 0.1% Na₂CO₃ | P | 100 | 100 |

TABLE 1 – Continued

Various Polyhydric Alcohols

| Alcohol | Weight % of Catalyst | Solubility of Catalyst in alcohol | % cleaning at temp. of: 450°F | % cleaning at temp. of: 350°F |
|---|---|---|---|---|
| Mannitol | No Catalyst | | 100 (scrubbed) | None |
| | 1% KOAc | + | 100 | 30 (washed) |
| | | | | 100 (scrubbed) |
| | 1% KOH | + | 100 | 100 |
| | 1% Na₂CO₃ | + | 90 (washed) | |
| | | | 100 (scrubbed) | 100 |
| | 0.1% KOAc | + | 100 (scrubbed) | 100 (scrubbed) |
| | 0.1% KOH | + | 100 (scrubbed) | 100 (scrubbed) |
| | 0.1% Na₂CO₃ | + | 100 (scrubbed) | 100 (scrubbed) |
| Monacetin | No Catalyst | | None | None |
| | 1% KOAc | + | 100 | 20 (washed) |
| | | | | 100 (scrubbed) |
| | 1% KOH | + | 100 | 100 |
| | 1% Na₂CO₃ | P | 40 (washed) | |
| | | | 95 (scrubbed) | 100 (scrubbed) |
| | 0.1% KOAc | + | None* | 100 (scrubbed) |
| | 0.1% KOH | + | None* | 100 (scrubbed) |
| | 0.1% Na₂CO₃ | P | None* | None* |
| Trimethylol ethane | No Catalyst | | Not Tested | None (sublimes) |
| | 1.0% KOAc | + | Not Tested | 100 |
| | 1.0% KOH | + | Not Tested | 100 |
| Trimethylol propane | No Catalyst | | Not Tested | None |
| | 1.0% KOAc | + | Not Tested | 100 |
| | 1.0% KOH | + | Not Tested | 100 |
| | 0.5% KOAc | + | Not Tested | 100 |
| | 0.5% KOH | + | Not Tested | 100 |
| 1,2,6 trihydroxy hexane | 1.0% KOAc | + | Not Tested | 95 |
| Carbowax 200** | 1.0% KOAc | + | Not Tested | 100 |
| Carbowax 300** | 1.0% KOAc | + | Not Tested | 100 |
| Carbowax 400** | 1.0% KOAc | + | Not Tested | 100 |
| Carbowax 600** | 1.0% KOAc | + | Not Tested | 100 |
| Inositol | 1.0% KOAc | + | 100% | None |
| Pentaerythritol | No Catalyst | | None | None |
| | 1% KOAc | + | 100 | 20 (washed) |
| | | | | 100 (scrubbed) |
| | 1% KOH | + | 98 | 100 |
| | 1% Na₂CO₃ | P | 50 (washed) | 100 |
| | | | 98 (scrubbed) | |
| | 0.1% KOAc | + | 100 (scrubbed) | None |
| | 0.1% KOH | + | 100 (scrubbed) | None |
| | 0.1% Na₂CO₃ | P | 100 (scrubbed) | None |

*Monoacetin Evaporated.
**Mixed polyethylene glycols sold by the Union Carbide Corp.

EXAMPLE 2

The baked lard soil cleaning tests of Example 1 were repeated with sorbitol alone and with various bases and alkalis. The results are reported in Table 2.

TABLE 2

Sorbitol with Various Catalysts

| Catalyst | % by Weight | Solubility of Catalyst in molten sorbitol | % cleaning at temp. of: 450°F | % cleaning at temp. of: 350°F |
|---|---|---|---|---|
| No Catalyst | | | 100 (scrubbed) | None |
| NaOAc | 1.0 | + | 100 | 85 (washed) |
| | | | | 99 (scrubbed) |
| | 0.5 | + | 100 | None |
| | 0.1 | + | 100 | None |
| | 1.0 | + | 100 | 85 (washed) |
| | | | | 98 (scrubbed) |
| KOAc | 0.5 | + | 100 | 20 (washed) |
| | | | | 99 (scrubbed) |
| | 0.1 | + | 100 | 98 (scrubbed) |
| | 1.0 | + | 100 | 95 |
| LiOAc | 0.5 | + | 100 | 99 (scrubbed) |
| | 0.1 | + | 100 | 40 (washed) |
| | | | | 98 (scrubbed) |
| | 1.0 | + | 100 | None |
| CaOAc | 0.5 | + | 100 | None |
| | 0.1 | + | 100 | None |
| Na glycolate | 1.0 | + | 100 | None |
| | 0.5 | + | 100 | None |
| | 0.1 | + | 100 | None |
| Na formate | 1.0 | + | 100 | 80 |
| | 0.5 | + | 100 | 99 (scrubbed) |
| | 0.1 | + | 100 | 98 (scrubbed) |
| Na glycinate | 1.0 | + | 100 | 80 |
| | 0.5 | + | 100 | 95 (washed) |
| | | | | 99 (scrubbed) |
| | 0.1 | + | 100 | None |
| | 1.0 | + | 100 | 100 |

TABLE 2 — Continued

Sorbitol with Various Catalysts

| Catalyst | % by Weight | Solubility of Catalyst in molten sorbitol | % cleaning at temp. of: 450°F | 350°F |
|---|---|---|---|---|
| NaOH | 0.5 | + | 100 | 99 |
|  | 0.1 | + | 100 | 35 (washed) 80 (scrubbed) |
| KOH | 1.0 | + | 100 | 100 |
|  | 0.5 | + | 100 | 99 |
|  | 0.1 | + | 100 | 95 (washed) 99 (scrubbed) |
| LiOH.H$_2$O | 1.0 | + | 100 | 100 |
|  | 0.5 | + | 100 | 100 |
|  | 0.1 | + | 100 | 95 (washed) 99 (scrubbed) |
| Ca(OH)$_2$ | 1.0 | s | 100 | None |
|  | 0.5 | s | 100 (scrubbed) | None |
|  | 0.1 | s | 100 | None |
| Na$_2$CO$_3$ | 1.0 | + | 98 (scrubbed) | 99 |
|  | 0.5 | + | 100 | 100 |
|  | 0.1 | + | 100 | 95 (washed) 99 (scrubbed) |
| K$_2$CO$_3$ | 1.0 | + | 98 (scrubbed) | 99 |
|  | 0.5 | + | 100 | 99 |
|  | 0.1 | + | 100 | 99 (scrubbed) |
| Li$_2$CO$_3$ | 1.0 | p | 98 (scrubbed) | 100 |
|  | 0.5 | p | 100 | 98 |
|  | 0.1 | p | 100 | 40 (washed) 99 (scrubbed) |

With sorbitol as the polyhydric alcohol most of the areas that exhibited cleaning at 350°F appeared to peel off rather than actually dissolving in the wash water. At 450°F on the other hand, all of the ports treated with 0.1 percent catalyst required some effort to wash clean, but were better in this respect than when treated with sorbitol alone.

EXAMPLE 3

The baked soil cleaning test of Example 2 with varying salts and alkalis was repeated with glycerol. The results are reported in Table 3.

TABLE 3

Glycerol with Various Catalysts

| Catalyst | % by Weight | Solubility of Catalyst in glycerol | % cleaning at temp. of: 450°F | 350°F |
|---|---|---|---|---|
| No Catalyst |  |  | None | None |
| NaOAc | 1.0 | + | 99 | 100 |
|  | 0.5 | + | 100 | 100 |
|  | 0.1 | + | 75 | 100 |
| KOAc | 1.0 | + | 100 | 100 |
|  | 0.5 | + | 80 (washed) 100 (scrubbed) | 100 |
|  | 0.1 | + | 60 | 100 |
| LiOAc | 1.0 | + | 100 | 100 |
|  | 0.5 | + | 100 | 100 |
|  | 0.1 | + | 15 | 100 |
| Ca(OAc)$_2$ | 1.0 | + | 99 | 100 |
|  | 0.5 | + | 98 | 98 |
|  | 0.1 | + | None | 100 |
| Na glycolate | 1.0 | + | 100 | 100 |
|  | 0.5 | + | 100 | 100 |
|  | 0.1 | + | 15 | 100 |
| Na formate | 1.0 | + | 50 | 100 |
|  | 0.5 | + | 100 | 100 |
|  | 0.1 | + | 85 | 100 |
| Na glycinate | 1.0 | + | 100 | 100 |
|  | 0.5 | + | 60 (scrubbed) | 50 (washed) 95 (scrubbed) |
|  | 0.1 | + | 5 | 25 (washed) 100 (scrubbed) |
| NaOH | 1.0 | + | 99 | 100 |
|  | 0.5 | + | 100 | 100 |
|  | 0.1 | + | 80 | 100 |
| KOH | 1.0 | + | 99 | 100 |
|  | 0.5 | + | 100 | 100 |
|  | 0.1 | + | 70 | 100 |
| LiOH.H$_2$O | 1.0 | s | 100 | 100 |
|  | 0.5 | + | 100 (scrubbed) | 100 |
|  | 0.1 | + | 75 | 100 (scrubbed) |
| Ca(OH)$_2$ | 1.0 | s | 80 | 100 |
|  | 0.5 | s | None | None |
| Na$_2$CO$_3$ | 1.0 | +p | 100 | 95 |
|  | 0.5 | + | 98 (scrubbed) | 100 |
|  | 0.1 | + | 95 | 100 (scrubbed) |
| K$_2$CO$_3$ | 1.0 | + | None | 100 |
|  | 0.5 | + | 75 (scrubbed) | 70 (washed) 100 (scrubbed) |
|  | 0.1 | + | 60 | 100 (scrubbed) |
| Li$_2$CO$_3$ | 1.0 | s | 100 | 100 |
|  | 0.5 | s | 98 (scrubbed) | 100 |
|  | 0.1 | p | 10 | 75 (washed) 100 (scrubbed) |

Cleaning with the glycerol mixtures was better at 350°F, probably because at 450°F, the glycerol evaporated off too rapidly for alcoholysis to occur.

EXAMPLE 4

The following cleaning composition was prepared by simple mixing of the ingredients in the order listed, stirring being continued after each addition until solution or dispersion was complete:

|  | % by Weight |
|---|---|
| Water | 42.00 |
| Sorbitol | 54.72 |
| Dowfax 2 A-1 (sodium dodecyl ether sulfonate— an anionic) | 0.12 |
| Xanthan gum (Bipolymer XB-23) | 0.16 |
| Potassium acetate | 0.60 |
| Snowflake No. 301 calcite (−325 mesh) Ground calcium Carbonate | 2.40 |
|  | 100.00 |

Eighty percent by weight of the composition was placed in an ordinary aerosol can along with 20 percent by weight of a mixed fluorcarbon propellant. The can was fitted with a commercial valve and actuator button suitable for spraying the cleaning composition onto soiled surfaces in the form of a relatively thin, adherent foam. The cleaning composition was then sprayed into the right hand half of an electric cooking oven which had previously been heavily soiled by fatty spills baked down hard and dark brown by many subsequent heatings. The left hand half of the oven was left untreated in its original heavily soiled conditions. After the above spray treatment the oven was closed, set at 450°F and heated for 35 minutes. On cooling and washing out with a wet sponge, the treated half of the oven and particularly the inside of the oven door was seen to have been substantially cleaned, with only a few widely scattered specks and dribblets of hard black carbon still remaining. By comparison with the untreated half of the same oven, the treated half had been notably improved.

Various modifications of the compositions and method of the invention may be made without departing from the spirit or scope thereof and it is to be understood that the invention is to be limited only as defined in the appended claims.

We claim:

1. A method of removing soils containing free or combined organic acids comprising contacting the said soil with a weakly alkaline composition consisting essentially of at least one polyhydric alcohol compound having at least two free hydroxyl groups in which the numerical ratio of carbon atoms to hydroxy groups is not greater than 15, and 0.01 to 2 percent by weight of an alkaline acting catalyst capable of accelerating alcoholysis reactions, heating the soil and cleaning composition to at least 250° F to 550°F to form water soluble or water dispersible compounds, and then removing the residues remaining.

2. The method of claim 1 wherein the polyhydric alcohol compound having at least 2 hydroxy groups is selected from the group consisting of ethylene glycol, diethylene glycol, triethylene glycol, glycerol, diglycerol, triglycerol, pentaerythritol, sorbitol, mannitol, inositol, trimethylol propane, trimethylol ethane, aliphatic diols of 2 to 7 carbon atoms, aliphatic triols of 2 to 7 carbon atoms, and partial esters of polyols having at least 2 free hydroxy group and aliphatic carboxylic acids of 1 to 7 carbon atoms.

3. The method of claim 1 wherein the catalyst is at least one member of the group consisting of an alkali metal and alkaline earth metal bases and salts.

4. The method of claim 1 wherein the polyhydric alcohol compound has a ratio of carbon atoms to hydroxyl groups of not more than 4.

5. The method of claim 1 wherein the polyhydric alcohol is selected from the group consisting of mannitol and sorbitol and the catalyst is non-caustic and non-toxic.

6. The method of claim 1 wherein the composition is anhydrous.

7. The method of claim 1 wherein the polyhydric alcohol has a boiling point above 350°F, is water-soluble and melts below 500°F and is present in 10 to 90 percent by weight of the composition.

8. The method of claim 1 wherein the carbon atom-hydroxyl ratio is 4 to 1 or less.

9. The method of claim 1 wherein the alkaline acting catalyst is selected from the groups consisting of alkali metal and alkaline earth metal bases and salts, alkali metal alcoholates and alkoxides of calcium, magnesium, lead, tin and zinc.

10. The method of claim 1 wherein the composition also contains at least one member of the group consisting of a surface active agent and an inert, fine granular material.

* * * * *